Oct. 29, 1968
T. W. JOHNSON
3,407,859
INNER SAFETY TIRE BUFFER WITH AIR SIMULATING MEANS
Filed May 9, 1966
2 Sheets-Sheet 1
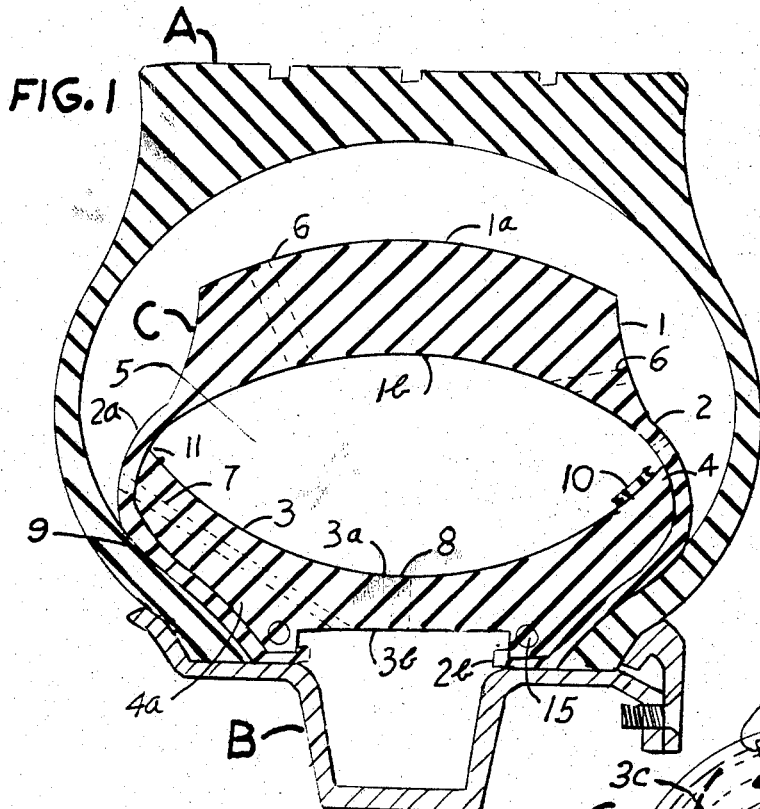
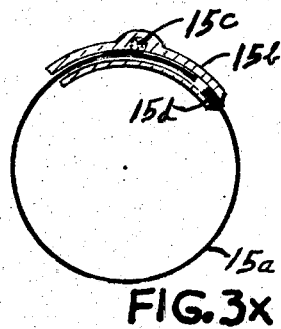
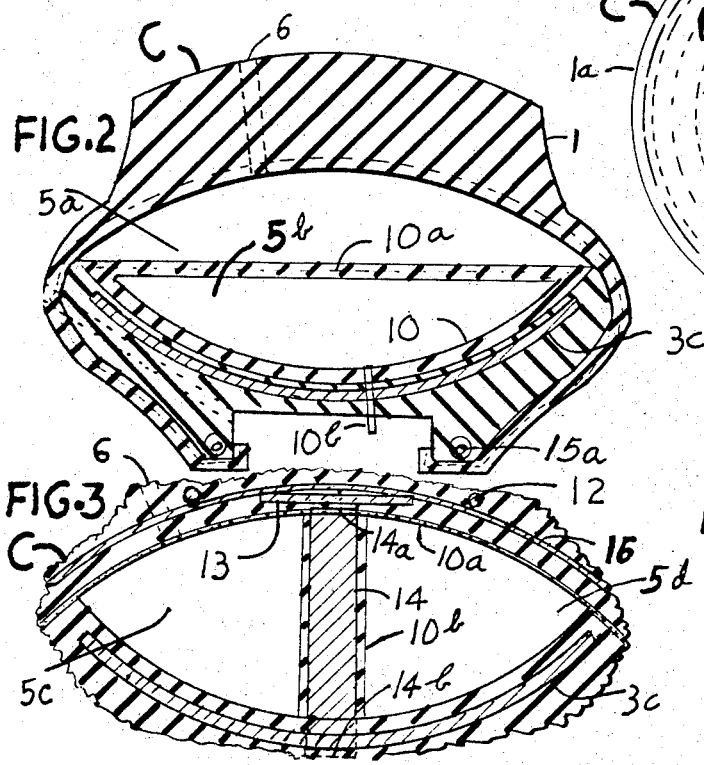
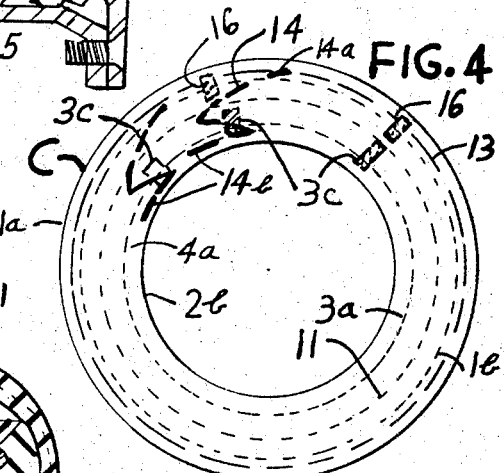
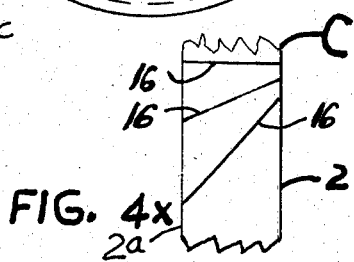
INVENTOR.
Tilden W. Johnson

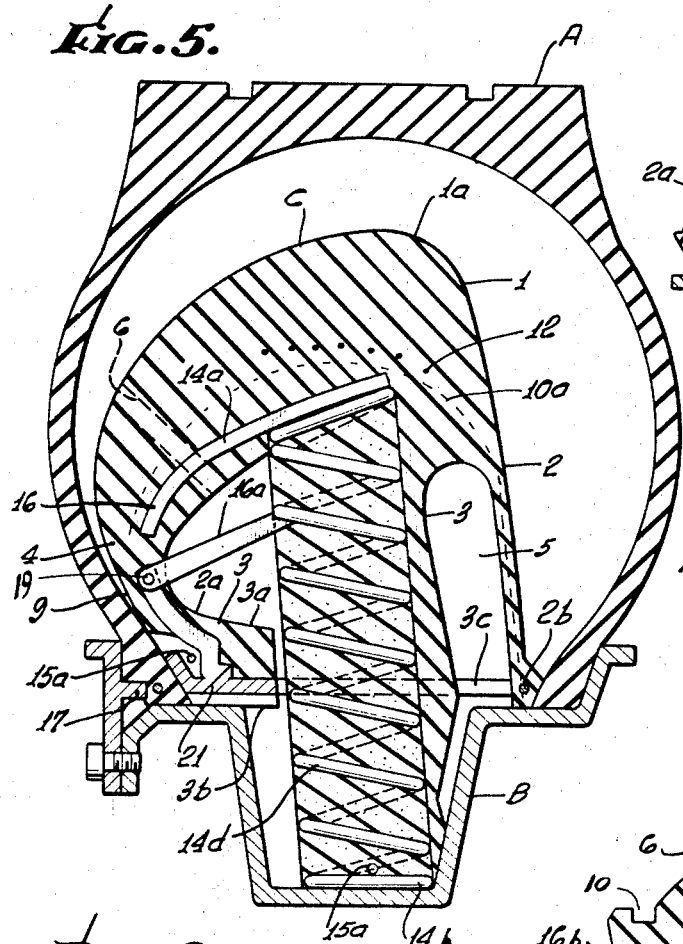
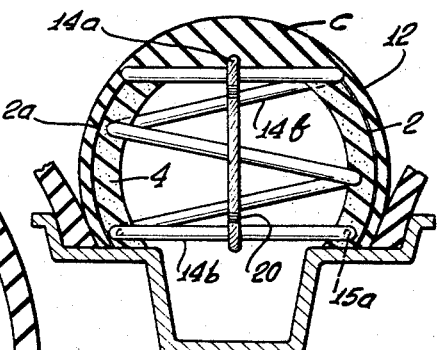
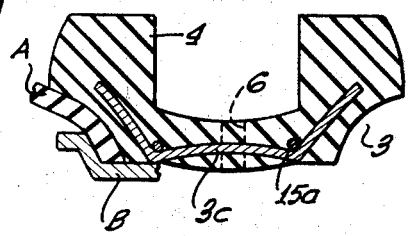
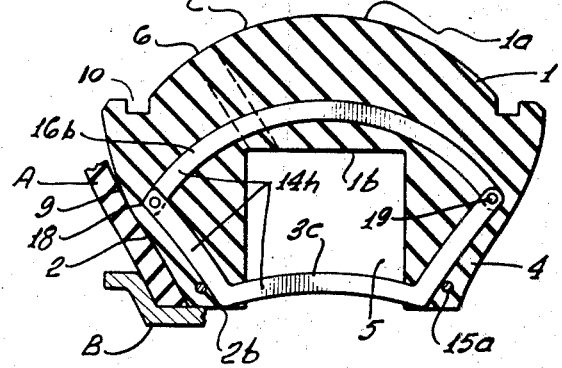
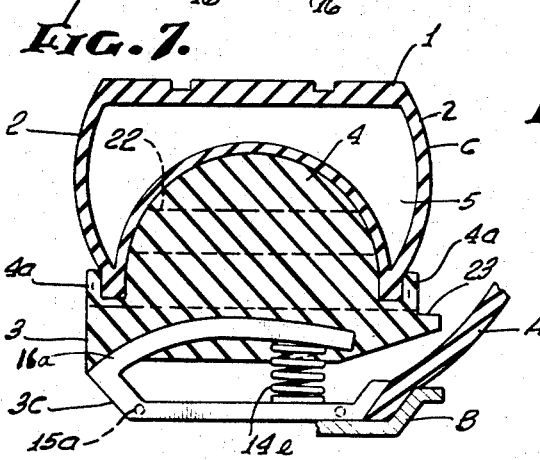
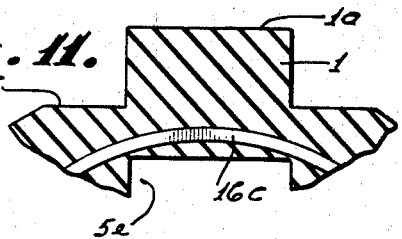
INVENTOR.
Tilden W. Johnson United States Patent Office 3,407,859
Patented Oct. 29, 1968

3,407,859
INNER SAFETY TIRE BUFFER WITH AIR
SIMULATING MEANS
Tilden William Johnson, 5630 Sawtelle Blvd.,
Culver City, Calif. 90230
Continuation-in-part of application Ser. No. 424,747,
Jan. 11, 1965. This application May 9, 1966, Ser.
No. 557,329
14 Claims. (Cl. 152—158)

ABSTRACT OF THE DISCLOSURE

A wheel supporting buffer constituting a flexible rim extension resembling a tire constructed by manufacturing a cap sufficiently strong and shape retaining anchored that one specie can support normal vehicle load by a pull from the top and sides of the buffer sidewalls that attach to the wheel rim, but space between the buffer cap and wheel rim permits the buffer cap to yield quickly like a pneumatic tire to road obstacles that produce shock loads, one specie utilizing differential air pressures between enclosing tire air and buffer supporting tube air to nullify the buffer tube support when the enclosing tire is inflated, but in case of loss of enclosing tire air, the buffer tube expands to increase buffer load bearing capacity, some species having bead expanding and tensioning means that facilitate buffer installation on regular drop center rims with or without newly invented enclosing tire expandable beads as well as removable flange rims, said buffer having sizable secondary solid tire protection against tire failure by the buffer bead and sidewall brace having one solid buffer on at least one rim tire bead seat half as high as floating cap of the buffer, construction utilizing tendency to shear towards rim drop center increases solid tire flexibility.

---

The present invention is a continuation-in-part improvement on a divisional election copending application 424,747, now Patent No. 3,250,310, entitled Auxiliary Wheel Buffer Inside a Tire, the parent title being Flexible Rim Extension to Buffer Tires and Increase Braking Efficiency, which in turn was a continuation-in-part of my Ser. No. 175,926, filed Feb. 27, 1962, for a High Speed Safety Wheel and Components Therefor, now divisional Patent No. 3,172,447 upon election of species.

This invention relates to improvements in auxiliary wheel buffers inside a tire to prevent wheel drop and braking upsets upon loss of air from enclosing tires at high speeds and sets forth a novel air simulating bracing structure in the tire cap and sidewall expanding cradle whereby the buffer resembles a pneumatic tire so constructed that enclosing tire air pressure tends to lessen buffer resistance to shock loads, but upon loss of enclosing tire air pressure the buffer suddenly gains increased resistance to loads and shock loads. This novel buffer rim contacting cradle enables heated enclosing tire air to utilize the iron rim to radiate heat several hundred times faster than tires do, and thus makes possible the use of extremely thin sidewall enclosing tires and caps that run cooler and thus melt less on the highway which increases the mileage from enclosing tires and makes it safe to retread the enclosing tire several times for less tire costs with greater tire and wheel safety.

During the past sixty years automobile pneumatic wheel assemblies have had a slow evolution from the horse and buggy solid wheel with an axle spring used for an average speed of 5 to 10 miles per hour to the modern drop center automobile wheels with thin sidewall and caps utilizing a tubeless tire useable for speeds of 100 miles per hour. However, haphazard wheel changes good for say speeds of 40 miles per hour because of the square of the speed law of physics applicable to wheel impact forces of a million pounds for short distances not provided for at the 40 miles per hour speed and the greatly increased heat build-up from tire flexing at high speeds, results in daily news items such as "6 people killed upon head-on collision at 90 miles per hour following tire failure and loss of braking efficiency and car control." This haphazard wheel development through the past 60 years thus adds to the 50,000 automobile occupants killed annually on the highways of the United States not to say anything of the millions annually injured and the billions of dollars annual accident loss and suffering from injuries.

It is the object of this ivention to set forth a novel construction of an inner safety tire buffer that increases the factor of safety of pneumatic wheel assemblies whereby speeds of 65 to 100 miles per hour present no danger from wheel drop on loss of enclosing tire air. To do this it is necessary to utilize all available mathematical calculations for moving forces, the physical facts that rubber vulcanizes at about 280 degrees Fahrenheit and begins to melt on the road at 200 degrees Fahrenheit, that enclosing tire flexing without thin tire sidewalls can cause heats of 300 degrees Fahrenheit at sustained speeds on a hot day of 65 to 100 miles per hour, and to keep in mind the fact an iron rim can conduct heat from enclosed tire air several hundred times faster than a tire can. It is also necessary to keep in mind the fact that an ideal safety wheel assembly must thus begin with thin sidewall and cap enclosing tires enclosing a bufferlike rim extension bearing a tirelike structure that is capable of maintaining wheel height without use of air or with only partial use of air so that the safety wheel gradually offers a steadily increasing resistance to shock loads in a uniform manner from said thin sidewall enclosing tire cap to the iron rim in shock loads as occurs in traveling over a 4 inch high road obstruction.

These and other objects and advantages of the invention will become apparent from the following description of the invention, taken in connection with the accompanying drawings, in which:

FIGURE 1 is a transverse section of a rim buffer and tire assembly embodying the principal characteristics of the invention. Note air holes 7 provide for enclosed air circulation to the rim whether an indicated tube as 10 is used or not and how holes 6 enable installation over the cap of a pneumatic tire and use of differential air pressures in tube 10 and enclosing tire air, when a tube is used. Note buffer lateral centerline inward cap can radially fluctuate between angles of 40 to 135 degrees from the vertical from buffer point 4. (This is a right handed view.)

FIGURE 2 is a transverse section view of the buffer alone. Note possible tube 10 can be attached at points 4 and have a reinforced cap 10a so differential air pressure between tube 10 and enclosed tire when in operative position prevents the tube 10 increasing buffer resistance to shock loads if enclosed in higher pressures from the enclosing tire.

FIGURE 3 is a transverse fragmentary section view of the buffer showing addition of springs 14 and how two tubes used on each side of the spring in air spaces 5c and 5d attached to 10a enables differential air pressure to also depress springs 14 when enclosing tire higher air pressure exists and use of flexible circumferential reinforcements 13 and 16 and 12. Note one specie of this figure may use springs without the tubes.

FIGURE 3x is an elevational view showing how substantially inextensible bead core of buffer 15 has two ends at 15d enclosed in a hollow item 15b whereby circular sprocket 15c can expand strap 15.

FIGURE 4 is an elevation view from outside said buffer, hence broken lines used. Note item reinforcement means 3c, 13, 12 and 16 are shown symbolically at more than one point indicating one or more to be used as required. Note how spring 14 shown in FIGURE 3 appears in the broken line in elevation and how shock loads cause the spring to twist item 3c around which item 14 is wrapped and how item 14 point at 14b stretches bead rubber. This causes the heat to be developed adjacent to the iron rim for quick radiation by the rim out of the enclosure instead of the buffer cap heating up the tire air from hysteresis from flexing at high speed. Other type springs could be substituted as 14d–e–f–g–h and 16 in FIGURES 5 thru 11.

FIGURE 4x is a plan view showing how the lateral and circumferential angles of item 16 can vary through a 90 degree angle.

FIGURE 5 is a transverse section view of a wheel assembly, left hand view, showing how basic cradle 3 with solid tires 4 located and bearing on the enclosing tire sidewall over the rim flange can have one of said tires enlarged and curved inward and supported by a spring such as 14d–e–f and/or 12 and 13.

FIGURE 6 is a plan view indicating as FIGURE 4 also does variations from strictly lateral of bracing such as 16.

FIGURE 7 is a transverse sectional view of possible buffer structure as in FIGURE 5 supported by springs 16a as shown in FIGURE 5 or 3c as shown in FIGURE 7 and 14e with a pneumatic tire superimposed over the inward turned enlargement of one tire 4 in FIGURE 9. Note expansible bead strap 15a as in FIGURE 5 and other figures herein enable this buffer bead to expand over a one piece rim. Fragmentary section of enclosing tire A and rim B indicates relative positions of items.

FIGURE 8 is a transverse section view indicating another type of bracing and buffer structure.

FIGURE 9 is a transverse sectional view of the basic cradle of this invention, item 3 with one or more solid tires principally bearing on the enclosed tire sidewall over the rim tire retaining flange. Item 3c may or may not be the basic part of item 3. Note expansible strap 15a enables this structure to be installable in regular tubeless tires and one piece drop center rims. Fragmentary sections of enclosing tire A and rim B illustrate comparative assembly relationships.

FIGURE 10 is a cross section view of the buffer in FIGURE 9 with separate solid tires joined by a cap brace constituting a cap as item 1. Note special brace 16b transfers loads and shock loads to a point just outside the top of rim flange B tending to pull up the buffer beads from the rim seat base. Fragmentary sections of enclosing tire A and rim B indicate relative positions of assembly.

FIGURE 11 is a cross section view in fragmentary form of another shape of the buffer. Note item 1 in its limited radial extension could be a separate structure and joined to C by for example leather tongs or bolts extending radially from the air space 5e.

Referring more particularly to the drawings by letters and numbers:

Because several variations of the same basic item appears in the 11 figures, I use the basic number followed by letter additions to differentiate appearance in a different figure of the item or a variation in structure of the item.

Letter A indicates the enclosing tire and is no part of this invention except it illustrates the fact an enclosing tire of low profile with thin sidewalls and cap runs coolest with this combination designed for high speed travel and its related heat problem. This particular tire of course is referred to as assembly means in an assembly claim.

Letter B represents a rim and as in FIGURE 1 indicates the best type rim. However, it is patented separately and herein is only referred to as means in a general assembly independent claim. In other figures herein B represents any rim, either one piece or two piece or more rims.

Letter C represents the buffer the object of this invention and by combining the basic structure appearing in FIGURE 9 herein with variations in complementary structure several forms can be derived as shown in FIGURES 1 thru 11 herein.

1 is the buffer cap. 1a represents the greatest circumference of cap 1 and 1b represents the inward surface of buffer cap 1.

2 represents the thin tirelike buffer sidewall section on the right side of the buffer and 2a the like left side location. 2b represents bead reinforcement.

3 represents the crescent shaped basic cradle and/or lateral bead and tire buffer sidewall brace. 3a represents the lateral buffer centerline inward buffer shape of 3 and said crescent shape generally and 3b represents the least circumference of 3. 3c represents flexible spring and/or synthetic bracing embedded in the synthetic crescent 3.

4 represents the tirelike crescent points of 3, and 4a represents provisions for retention in place of superimposed tires on the buffer cap as in FIGURE 7.

5 represents enclosed buffer air space. 5a represents in FIGURE 2 buffer air space filled by high pressure enclosing tire air and 5b represents air space inside tube 10 at lower air pressure. 5c and 5d in FIGURE 3 indicate that when springs are also used as 14 the air space 5 of FIGURE 1 has a separate right and left side that can both be connected with a reinforced tube cap 10a so differential air pressure will also depress spring 14. This tends to prevent doubling suddenly enclosing tire resistance to shock and buffer resistance to road obstruction negotiation in use.

6 represents buffer cap air holes to utilize differential air pressure in enclosing tire A and tube 10 and as means to hold in location by leather tongs or appropriate means superimposed air tires over the buffer cap.

7 represents air holes in the crescent shaped buffer cradle 3 permitting air to circulate from the enclosed tire to the iron rim for heat radiation and conduction advantages. It should be noted this feature can in some case enable two sets of enclosing tires to last as long as 3 or 4 sets of enclosing tires where an inner tire blocks enclosed tire air from the iron rim.

8 represents an air hole in the buffer crescent shaped cradle 3 so air from buffer space 5 in FIGURE 1 can also circulate to the rim when the buffer in FIGURE 1 is used without the tube 10.

9 represents the approximate location at which the buffer structure must cease following the enclosing tire sidewall to prevent heat formation from unnecessary buffer and enclosing tire flexing at high speed which incidentally is a serious problem and can quickly melt an enclosing tire on a hot day at high speed.

10 represents a tube to be used inside buffer space 5 and in FIGURE 1 is in fragmentary form so as to indicate in FIGURE 1 the buffer is operational without use of the tube 10. Item 10a represents special reinforcement in the cap of tube 10 in some cases to make special use of differential air pressure to increase uniform resistance to shock loads instead of a sudden doubling of resistance when the buffer cap is contacted. 10b represents special tube structure means when springs are used as in FIGURE 3 where tube 10 though perhaps joined by 10a or attached to same come in separate left and right hand sections.

11 represents for discussion and illustration the extreme tips of item 4 which is the crescent shaped buffer cradle.

12 represents circumferentially extending spring steel and/or synthetic flexible bracing to enable the buffer cap to simulate an air tire in providing lift when in operational position from the upper half of the buffer cap circumference transmitted by buffer sidewalls and beads to the rim to support the wheel hub. These may be continuous or in overlapped sections.

13 represents circumferential bracing as in item 12 except wide laterally to resist for one use nail penetration when tube 10 is used.

14 represents a special spring steel and/or synthetic spring as shown in FIGURE 3 and FIGURE 4. It is usually attached to item 3c when 3c is used and projected circumferentially along the buffer bead so extreme point 14b as shown in FIGURE 4 tends to pull up the buffer bead rubber when the cap encounters loads and shock loads at point 14a in the buffer cap as in FIGURE 4. For discussion purposes 14a and 14b represents radial location points in the bufffer as particularly shown in FIGURES 3 and 4. 14d–e–f–g–h in other figures illustrate other forms of springs substitutable for 14.

15 represents substantially inextensible buffer bead strap as in FIGURE 1. However, FIGURE 1 is operational without said strap. 15a represents an expansible version of 15 as in FIGURE 3x.

Item 16 represents mostly a plurality of laterally extending cap braces for certain heavy loads and may have various angles laterally traversing said buffer cap as in FIGURES 4x and 6. Item 16a represents a special form as in FIGURE 5, and is the top section of an ellipse shape spring with an open end as in figure. Item 16b is a special type in FIGURE 10 and 16c symbolizes another use in FIGURE 11.

17 represents rim special air sealing provisions for installation of buffer type shown in FIGURE 5.

18 represents how a radial arm of 3c can be forced to seesaw over the enclosing tire over the rim tire retaining flange in FIGURE 10 and use of a bolt 19.

19 represents bolts, and/or rivets or other similar joining means.

20 represents a strap extending radially to hold pretensioned springs as in FIGURE 8 in the precompressed state.

21 represents a special expansible bead structure for 15a in item 3c in FIGURE 5.

Item 22 represents lateral holes in a buffer tire structure as in FIGURE 7 to provide increased shock load flexibility.

Item 23 represents the extreme flexible tip similar to 4 that in the buffer in FIGURE 7 thrusts against the enclosing tire sidewall at a point outside the rim flange when shock loads are encountered.

The buffer in FIGURE 1 is constructed by improving the basic crescent shape shown in FIGURE 9 to the shape shown in FIGURE 1. Then my tire invention, Patent no. 3,172,447 is improved as shown with a sturdier cap and is fitted in the two inward hooked bead form around said crescent shaped structure and one side may be vulcanized to said crescent shape buffer cradle. When used without a tube the tire beads and sidewalls may be vulcanized to said crescent shaped item 3. When tube 10 is to be used one sidewall of said tire should be merely fitted around item 3. Since the final retention of a circular shape of equal radius of buffer cap is achieved by lateral extension of tire sidewalls by item 3 and fit around an iron rim or metal rim, it is apparent that when uninstalled buffer C as in FIGURE 1 may be forced into the form of an ellipse and passed through regular substantially inextensible tubeless tire beads and by the use of buffer bead expansion straps as in item 15a said tire and buffer can be installed on suitable one piece drop center rims though a removable flange rim as in FIGURE 1 is preferable. A hole in a one piece drop center rim similar to the valve hole can be used to insert a tool and release the expansible bead straps of the buffer and valve 10b used to inflate if necessary tube 10 when used.

Thus an important advantage of this invention is that it is useable with one piece drop center rims and inextensible bead tubeless tires in addition to the other numerous advantages already set forth herein. FIGURE 1 is therefore the preferred embodiment for passenger cars though other variations are superior for heavier cars. Those skilled in the art can from the description herein easily construct the other alternate structures set forth herein and install same on various makes of rims and various makes of tires, as this form of buffer has its own reinforcement in item 4 and 2 structure to protect tire sidewalls from excessive wear around the tire beads.

While those skilled in the art from the specifications and drawings can easily understand how to construct and install buffers in FIGURES 5 thru FIGURES 11 the following may help those less skilled. FIGURE 5 shows the same strong cap with specie variations in the buffer sidewall, bead bracing and springs. This buffer will fold load into an enclosing tire and on the removable flange rims the long springs can be thrust forward separately into the rim drop center and then the buffer forced over the rim bead seats or if used on a rim without a removable flange an expanding device 15a of great strength can so compress the springs and beads that they will pass over the top of the retaining flange and when the expanding strap is released snap into place. When used without a removable flange the bead brace should be made of flexible material so it will compress laterally permitting tire removal. FIGURE 7 is similar to FIGURES 5 and 1 but here the spring is shorter and greatest buffer radius is attained by safety tire over the cap. FIGURES 8 thru 11 are similar species of the same basic novel principle of buffer construction. Note when springs 14 are synthetic or rubber, substantial support develops from shear.

From the foregoing detailed description and drawings it is apparent I have invented a novel construction whereby a needed improvement occurs in buffer construction conception that increases the factor of safety of pneumatic wheels and some species set forth promote manufacturing economy and ease of installation on various type rims whereby buffer wheel support can become the rule instead of the exception and highway accidents from wheel failures less frequent, the objects of this invention.

While certain representative embodiments and details have been shown for the purpose of illustrating the invention, it will be apparent to those skilled in the art that various changes and modifications may be made therein without departing from the spirit or scope of the invention. Therefore the detailed description of the particular embodiment of the invention illustrated and described herein is not to be construed as limiting the invention thereto. The invention includes all features of patentable novelty residing in the foregoing description and the accompanying drawings.

I claim:

1. In a wheel assembly comprising a rim having mounted thereon a tubeless tire and buffer constructed of flexible material reinforced with synthetic material positioned interiorly of said tire, a buffer characterized by having in combination a cap, sidewalls and rim contacting beads said cap structure having material means sufficiently thick radially and wide laterally that substantial resistance to loss of equal radius circumference shape is provided sufficient to enable said cap when in operative position to provide substantial support to the wheel hub by an upward tension of said buffer sidewalls and beads from the topmost half circumference of said buffer cap simulating like forces provided by the cap of an inflated pneumatic tire, said buffer beads having lateral bracing means from buffer bead to buffer bead adjacent to the buffer bead area and immediately adjacent tire sidewalls.

2. A buffer as in claim 1 further characterized by said buffer caps having means facilitating the superimposing thereon of thin sidewall pneumatic tires.

3. A buffer as in claim 1 further characterized by means for utilizing the top of the rim tire retaining flanges and immediate adjacent enclosing tire sidewalls to provide greater flexible resistance to shock loads and means to protect said enclosing tire from excessive buffer wear in said bead and sidewall area.

4. A buffer as in claim 1 further characterized by sidewalls and bead means simulating tire sidewalls and beads and having means to tension and expand buffer beads whereby buffer installation and utilization is facilitated.

5. A buffer as in claim 4 further characterized by a crescent shaped buffer bead and sidewall laterally flexible bracing means, the points of said crescent shaped lateral bracing extending upward simulating two solid synthetic material tires bearing principally over the enclosing tire over the rim tire retaining flange, said crescent shaped points further extending said buffer tire sidewalls near the middle radius of said buffer that said buffer sidewalls extend laterally from said crescent points so that the inward centerline of said buffer cap is a substantial lateral angle from the vertical so that said buffer cap can flex through angles from the vertical from approximately 40 degrees to 135 degrees.

6. A buffer as in claim 5 further characterized by said crescent points and adjacent area having bracing means to provide substantial resistance to lateral compression, simulating an air tire characteristic that materially assists said buffer cap to provide substantial lift to the wheel hub from the topmost half circumference of said buffer cap, whereby shock loads are absorbed by said buffer cap and by said buffer tire sidewalls when pulled in a radial direction forcing said crescent shaped lateral bracing means to compress laterally permitting the said buffer sidewalls to elongate and the said buffer cap to flex through greater range at less loads and/or shock loads and said buffer cap to crush radially in the bottom of said crescent shaped lateral buffer bead brace under extreme shock loads providing means to prevent bracing means being permanently distorted.

7. A buffer as in claim 1 further characterized by a pneumatic tube installed in the hollow space in said buffer created by the ellipse formed by the said buffer cap and said crescent shaped bead brace and buffer sidewalls whereby air pressures in said enclosed buffer space less than air pressure in the enclosing tire reduces the shock load resistance of said buffer when said enclosing tire is inflated, but upon loss of enclosing tire air said buffer offers greater resistance to shock loads.

8. A buffer as in claim 1 having means to use springs to increase the load capacity of said buffer and to facilitate uniform flexibility under shock loads and having means to combine springs and air tubes in said buffer enclosed space to facilitate the flexibility and capacity of said buffer to simulate air tire operation characteristics.

9. In combination a rim having mounted thereon a tubeless tire and a buffer constructed of flexible material, said buffer positioned interiorly of said tire, said buffer having means to simulate mechanically the characteristics of an inflated air tire, said buffer having means to utilize air tubes, and said buffer having means to utilize differences in air pressure in said buffer and said enclosing tire whereby said buffer flexes under shock loads through greater distance with less initial resistance when said enclosing tire is inflated, but upon loss of enclosing tire air pressure said buffer exhibits greater resistance to shock load deformation and exhibits more restorative power.

10. A buffer as in claim 9 further characterized by said buffer having means to enable enclosing tire air heated by tire flexing at high speeds to utilize direct contact with the wheel rim to conduct said heat outside the said enclosing tire, and said buffer having means to hold enclosing tire beads laterally against dirt wedging and sidewall lateral forces in curves and swerves, and said buffer having means to expand and tension buffer beads to pass over rim flanges when installing on one piece rims and to facilitate buffer utility.

11. In a wheel assembly comprising a rim having mounted thereon a tubeless tire and buffer constructed of flexible material positioned interiorly of said tire, a solid buffer characterized by having in combination a load bearing cap and sides and means to firmly seat on at least one rim tire bead seat adjacent an enclosing tire bead and to bear on said rim tire bead seat and adjoining tire bead whereby bufferable adjustment of normal and shock loads is materially made more effective by said form and seating tending said buffer to shear towards the rim drop center.

12. A buffer as in claim 11 further characterized by being extended laterally over the rim drop center materially increasing the percent of the load borne by shearing action within the buffer.

13. A buffer as in claim 11 having means to reinforce the cap and lateral holes in the buffer so that loads are supported by said reinforced cap by a shearing compression from road load and a shearing tension fore and aft and from the top of said reinforced load bearing buffer cap.

14. A buffer as in claim 11 further characterized by means to superimpose over said buffer cap pneumatic safety tires.

References Cited
UNITED STATES PATENTS 3,250,310 5/1966 Johnson.
3,160,191 12/1964 Anderson.
1,919,911 7/1933 Shoemaker.

ARTHUR L. LA POINT, *Primary Examiner.*
R. A. BERTSCH, *Assistant Examiner.*